United States Patent
Lee

(10) Patent No.: US 9,891,865 B2
(45) Date of Patent: Feb. 13, 2018

(54) COMMAND ISSUE METHOD FOR ISSUING COMMAND TO MEMORY AND COMMAND PROCESSING METHOD OF MEMORY

(71) Applicant: Joon-Ho Lee, Suwon-si (KR)

(72) Inventor: Joon-Ho Lee, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 221 days.

(21) Appl. No.: 14/628,931

(22) Filed: Feb. 23, 2015

(65) Prior Publication Data

US 2015/0242123 A1    Aug. 27, 2015

(30) Foreign Application Priority Data

Feb. 24, 2014  (KR) .................. 10-2014-0021415

(51) Int. Cl.
*G06F 3/06* (2006.01)

(52) U.S. Cl.
CPC .......... *G06F 3/0659* (2013.01); *G06F 3/0607* (2013.01); *G06F 3/0661* (2013.01); *G06F 3/0679* (2013.01)

(58) Field of Classification Search
CPC .... G06F 3/0659; G06F 3/0679; G06F 3/0607; G06F 3/0661
See application file for complete search history.

(56) References Cited

U.S. PATENT DOCUMENTS

| 7,877,593 | B2 | 1/2011 | Tomlin et al. |
| 8,239,858 | B2 | 8/2012 | Booking et al. |
| 8,296,468 | B2 | 10/2012 | Kambayashi et al. |
| 8,484,407 | B2 | 7/2013 | Haukness et al. |
| 8,745,612 | B1* | 6/2014 | Semenzato ............... G06F 8/65 717/170 |
| 2011/0055458 | A1* | 3/2011 | Kuehne ............... G06F 12/0246 711/103 |
| 2012/0185631 | A1 | 7/2012 | Lin et al. |
| 2012/0201080 | A1* | 8/2012 | Kang ................. G11C 16/0483 365/185.11 |
| 2013/0054871 | A1 | 2/2013 | Lassa |
| 2013/0145106 | A1 | 6/2013 | Kan |
| 2014/0149670 | A1* | 5/2014 | Ezra ...................... G06F 3/0614 711/128 |

FOREIGN PATENT DOCUMENTS

| JP | 2007-148682 A | 6/2007 |
| KR | 10-2008-0033649 A | 4/2008 |

* cited by examiner

*Primary Examiner* — Reginald Bragdon
*Assistant Examiner* — Mehdi Namazi
(74) *Attorney, Agent, or Firm* — Volentine & Whitt, PLLC

(57) ABSTRACT

A method of providing special functions includes receiving from a host a first normal command and a first address, and identifying a first special function based on the first normal command and the first address when the first address is in an address range established for special functions according to a predefined rule.

24 Claims, 12 Drawing Sheets

FIG. 5

| Functions | | Command | Start Sector Number | Sector Offset | Sector Counts |
|---|---|---|---|---|---|
| Issue | Scan & Read Reclaim | Write | 0x80008000 | 1 | 1 |
| | Merge | | | 2 | |
| | Vendor Authentication | | | 3 | |
| | Firmware update | | | 4 | |
| | Disk Info. | | | 5 | |
| | All BLK erase | | | 6 | |
| Execution | | | | 0 | |
| Confirm | | Read | | 0 | Don't care |
| Status Check | | | | 1 | |

COMMAND ISSUE METHOD FOR ISSUING COMMAND TO MEMORY AND COMMAND PROCESSING METHOD OF MEMORY

CROSS-REFERENCE TO RELATED APPLICATIONS

A claim for priority under 35 U.S.C. § 119 is made to Korean Patent Application No. 10-2014-0021415 filed Feb. 24, 2014, in the Korean Intellectual Property Office, the entire contents of which are hereby incorporated by reference.

BACKGROUND

Embodiments of the inventive concept described herein relate to a semiconductor memory, and more particularly, to a method of issuing a command to a memory and a method of processing a command of the memory.

A semiconductor memory device is a memory device fabricated using semiconductor materials such as silicon (Si), germanium (Ge), gallium arsenide (GaAs), indium phosphide (InP), and the like. Semiconductor memory devices may be classified into volatile memory devices and nonvolatile memory devices.

Volatile memory devices lose contents stored therein when powered off. Examples of volatile memory devices include random access memory (RAM), static RAM (SRAM), dynamic RAM (DRAM), and synchronous DRAM (SDRAM). Nonvolatile memory devices retain stored contents even when powered off. Examples of nonvolatile memory devices include read only memory (ROM), programmable ROM (PROM), electrically programmable ROM (EPROM), electrically erasable and programmable ROM (EEPROM), a flash memory device, phase-change RAM (PRAM), magnetic RAM (MRAM), resistive RAM (RRAM), and ferroelectric RAM (FRAM).

SUMMARY

According to an aspect of the inventive concept, a method is provided for providing special functions. The method includes receiving from a host a first normal command and a first address, and identifying a first special function based on the first normal command and the first address when the first address is in an address range established for special functions according to a predefined rule.

According to another aspect of the inventive concept, a memory device includes a host interface, a nonvolatile memory and a controller. The host interface interfaces communications with a host device running an application. The nonvolatile memory stores multiple special operations executable by the application. The controller accesses the nonvolatile memory in response to normal commands and corresponding addresses received from the application through the host interface. The controller is configured to receive from the host a first normal command and a first address of the nonvolatile memory via the host interface, and to identify a first special function based on the first normal command and the first address when the first address is in an address range established for special functions according to a predefined rule.

According to another aspect of the inventive concept, a method implemented by a host device is provided for performing special operations specific to a memory device interfacing with the host device. The method includes issuing a selected special operation from among the special operations by sending to the memory device a first normal command and a first address corresponding to an issue function of the selected special operation, the first address being in an address range established for special functions according to a predefined rule; and requesting execution of the selected special operation by sending to the memory device a second normal command and a second address corresponding to an execution function, the second address being in the address range established for special functions according to the predefined rule.

BRIEF DESCRIPTION OF THE FIGURES

Exemplary embodiments of the inventive concept will be more clearly understood from the following description taken in conjunction with the accompanying drawings, in which like reference numerals refer to like parts throughout the various figures unless otherwise specified, and in which:

FIG. 5 is a table showing special functions provided for performing special operations, according to an embodiment of the inventive concept;

DETAILED DESCRIPTION

Figure 1:
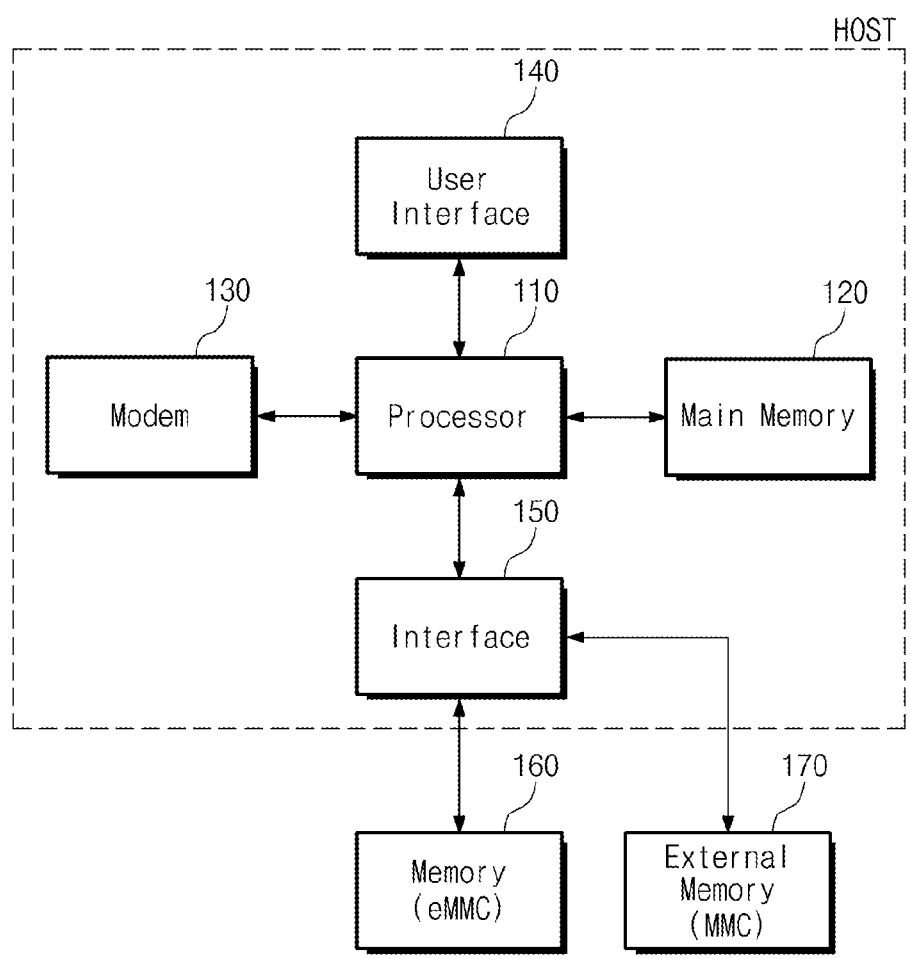
FIG. 1 is a block diagram schematically illustrating a computing device, according to a first embodiment of the inventive concept.

Embodiments will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. Unless otherwise noted, like reference numerals denote like elements throughout the attached drawings and written description, and thus descriptions may not be repeated. In the drawings, sizes and relative sizes of layers and regions may be exaggerated for clarity. Also, the term "exemplary" is intended to refer to an example or illustration.

FIG. 1 is a block diagram schematically illustrating a computing device, according to a first embodiment of the inventive concept. Referring to FIG. 1, a computing device 100a includes a processor 110, a main memory 120, a modem 130, a user interface 140, an interface 150, a memory 160, and an external memory 170.

The processor 110 controls overall operations of the computing device 100a for performing logical operations. For example, the processor 110 may be a system-on-chip (SoC). The processor 110 may include a general-purpose processor, a special-purpose processor, and the like.

The main memory 120 is a working memory of the processor 110. The main memory 120 stores codes driven by the processor 110 and data. The main memory 120 may include a random access memory, including a volatile random access memory, such as DRAM, SRAM, or SDRAM, for example. The main memory 120 may include a nonvolatile random access memory, such as FRAM, PRAM, MRAM, or RRAM or for example.

The modem 130 communicates with an external device under control of the processor 110. For example, the modem 130 communicates with an external device based on at least one of wireless communication standard, such as Long Term Evolution (LTE), WiMax, Global System for Mobile communication (GSM), Code Division Multiple Access (CDMA), Bluetooth, Near Field Communication (NFC), WiFi, Radio Frequency Identification (RFID), and the like. The modem 130 may be integrated in a semiconductor integrated circuit together with the processor 110.

The user interface 140 communicates with a user according to a control of the processor 110. For example, the user interface 140 may include user input interfaces such as a keyboard, a keypad, a button, a touch panel, a touch screen, a touch pad, a touch ball, a camera, a microphone, a gyroscope sensor, a vibration sensor, and so on. The user interface 140 may further include user output interfaces such as an LCD device, an OLED (Organic Light Emitting Diode) display device, an AMOLED (Active Matrix OLED) display device, an LED, a speaker, a motor, and so on.

The interface 150 interfaces communications between the processor 110 and storage devices. The memory 160 communicates with the processor 110 through the interface 150, and is accessible by the processor 110. The memory 160 may include a nonvolatile memory, for example, and may include an embedded MultiMedia Card (eMMC). The external memory 170 also communicates with the processor 110 through the interface 150, and is accessible by the processor 110. The external memory 170 may be a removable nonvolatile memory, and may include an MMC (MultiMedia Card).

In exemplary embodiments, the computing device 100a may be a portable smart multimedia device such as a smart phone, a smart tablet or the like. Also, the processor 110, main memory 120, modem 130, user interface 140, and interface 150 may constitute a host of the memory 160 or the external memory 170.

Figure 2:
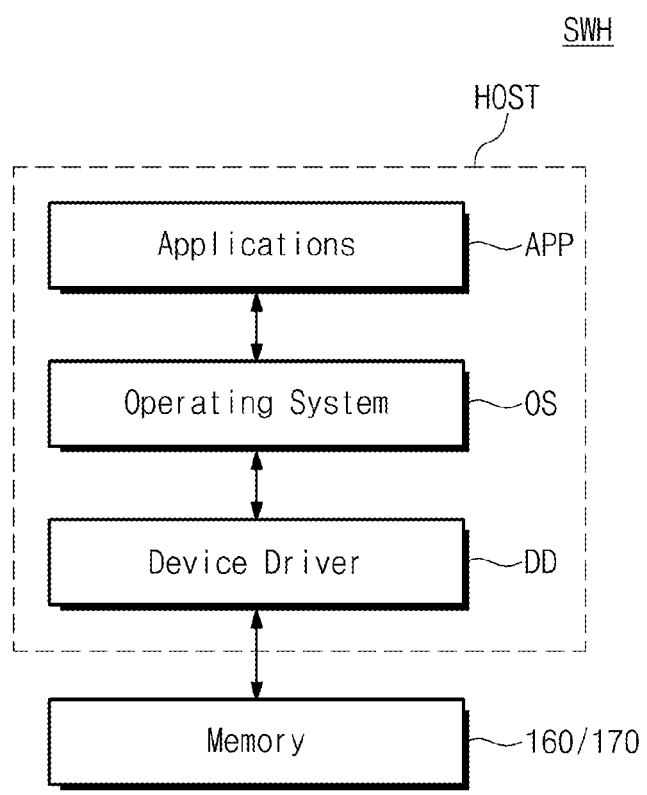
FIG. 2 is a block diagram schematically illustrating a software hierarchy of a computing system accessing a memory or external memory, according to an embodiment of the inventive concept.

FIG. 2 is a block diagram schematically illustrating a software hierarchy SWH of the computing system 100a accessing a memory or external memory 160/170. Referring to FIGS. 1 and 2, the software hierarchy SWH includes one or more applications APP, an operating system OS, a device driver DD, and a memory 160/170.

The applications APP are driven by the processor 110 on the operating system OS. The applications APP are accessed according to requests of a user (e.g., a user of the computing device 100a) or according to a predefined schedule, using a resource (e.g., a memory, an operation ability or the like) allocated by the operating system OS.

The applications APP may include a variety of software for executing various purposes. For example, the applications APP may include a word processor, a spread sheet, database, and software for generating and playing multimedia contents. The applications APP also may include software for managing the memory 160/170 efficiently.

The operating system OS is driven by the processor 110. The operating system OS manages resources (e.g., a memory, an operation ability, and the like) of the computing system 100a. The operating system OS allocates resources (e.g., a memory, an operation ability, and the like) of the applications APP. The operating system OS accesses hardware of the computing device 100a according to requests of the applications APP.

The device driver DD converts a hardware access request, e.g., generated by the operating system OS, into a command that hardware recognizes. For example, the operating system OS may generate a logical command for managing resources, and the device driver DD converts the logical command, generated by the operating system OS, into a physical command.

The memory 160/170 is accessed by commands transmitted from the device driver DD. The applications APP, operating system OS, and device driver DD may constitute a host of the memory 160/170.

In a typical smart multimedia device, the operating system OS does not grant root authority to the applications APP. That is, the applications APP do not access components of the computing device 100a directly. The applications APP access an OS-distributed resource through the operating system OS using authority granted by the operating system OS.

Even though device-specific special operations and functions are provided to the memory 160 or the external memory 170, under the condition that root authority is not granted to the applications APP, the applications APP cannot use the device-specific special operations or functions because the operating system OS does not grant authority for the device-specific special operations or functions, but just grants authority for normal operations or functions for general devices.

In exemplary embodiments, the memory 160 and/or the external memory 170 (which may be referred to as "memory 160/170") is fabricated according to the Secure Digital (SD) card specification. In addition to a normal command, the SD card specification allows vendor-specific commands. The normal commands may include a read command, a write command, and the like, used to issue operations (e.g., a read operation, a write operation, and the like) generally used. The vendor-specific commands include a command by which a vendor defines an operation (or a function). For example, an operation for supporting an easy test of the memory 160/170, and an operation for supporting a debug of the memory 160/170, may be defined as special operations, and the special operations may be executed using vendor-specific commands.

When the special operations of the memory 160/170 are used during a normal operation of the computing device 100a, operation performance of the computing device 100a is improved. For example, the applications APP may use the special operations in addition to normal operations to improve operation performance of the computing device 100a.

In the event that the operating system OS driven on the computing device 100a does not grant root authority to the applications APP, the applications APP issue normal commands such as a read command, a write command, etc., but they do not issue vendor-specific commands.

Figure 3:
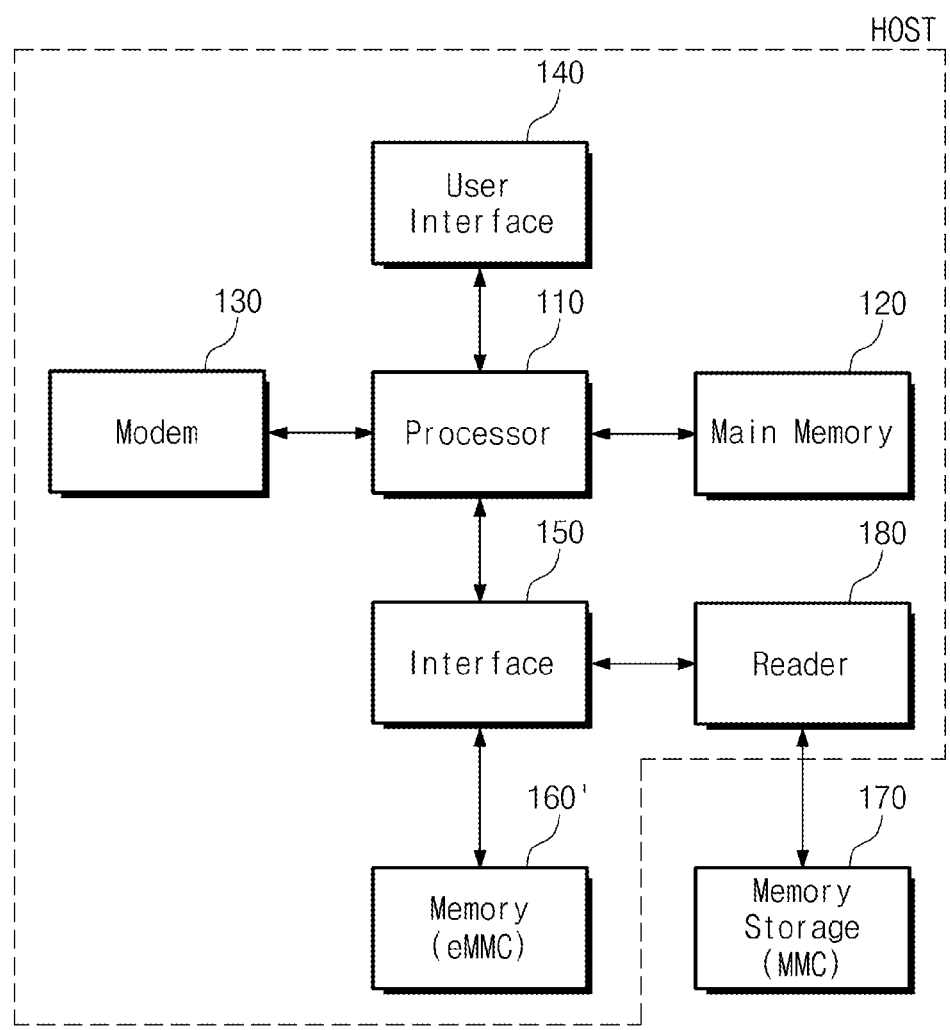
FIG. 3 is a block diagram schematically illustrating a computing device, according to a second embodiment of the inventive concept.

FIG. 3 is a block diagram schematically illustrating a computing device, according to a second embodiment of the inventive concept. Referring to FIG. 3, a computing device 100b includes a processor 110, a main memory 120, a modem 130, a user interface 140, an interface 150, a memory 160', an external memory 170, and a reader 180.

As compared to the computing device 100a shown in FIG. 1, the computing device 100b further comprises the reader 180. The reader 180 communicates with the processor 110 through the interface 150. The reader 180 controls the external memory 170 under control of the processor 110. The memory 160' of the computing device 100b may include a nonvolatile mass storage device, such as a hard disk drive (HDD) or a solid state drive (SSD), for example. The computing device 100b may be a personal computer or a notebook computer, for example.

The processor 110, the main memory 120, the modem 130, the user interface 140, the interface 150, the memory 160', and the reader 180 may constitute a host of the external memory 170.

In exemplary embodiments, the software hierarchy computing device 100b may be the same as that shown in FIG. 2. In the event that the computing device 100b is a general-purpose computer, an operating system OS may grant root authority to applications APP. In the event that the computing device 100b is a general-purpose computer, however, the external memory 170, such as an MMC, is connected to the host through the reader 180.

The reader 180 communicates with the interface 150 according to a predefined communication protocol. For example, the reader 180 may communicate with the interface 150 according to a universal serial bus (USB) protocol. The USB protocol supports normal commands (e.g., read and write command) but does not support issuance of vendor-specific commands supported by the external memory 170. When the external memory 170 is connected to the interface 150 through the reader 180, the applications APP do not use special operations provided to the external memory 170.

As described with reference to FIG. 1, the operating system OS of the computing device 100a, such as a smart multimedia device, does not grant a root authority to applications APP. In this case, although special operations are provided to the memory 160/170 such as eMMC and MMC, for example, the applications APP are unable to issue special commands for executing the special operations. Likewise, as described with reference to FIG. 3, when special operations are provided to a memory (e.g., eMMC or MMC) at a state in which the memory 170 is connected to the host through the reader 180 in the computing device 100b, such as a general-purpose computer, the applications APP are unable to issue special commands for executing the special operations.

To address the above-described issue, the computing devices 100a and 100b according to embodiments of the inventive concept may issue a special operation using a normal command and an address. For example, the applications APP driven on the computing device 100a or 100b may select a special operation that the memory 160/170 provides. The applications APP select a normal command and an address corresponding to the selected special operation according to a predefined rule. It may be determined that the normal command and address correspond to the selected special operation (and/or special function executed with respect to the special operation) when the address is in an address range established for special operations/functions according to the predefined rule, as discussed below. The applications APP issue the selected normal command and address; therefore, they issue a special operation to the memory 160/170.

Figure 4:
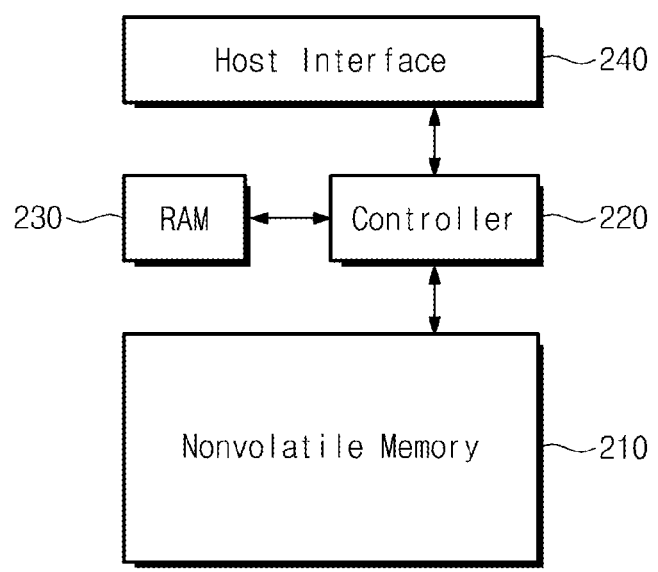
FIG. 4 is a block diagram schematically illustrating a memory, according to an embodiment of the inventive concept.

FIG. 4 is a block diagram schematically illustrating a memory 160/170, according to an embodiment of the inventive concept. For example, the memory 160/170 may be a memory 160, that is, an eMMC described with reference to FIG. 1. The memory 160/170 may be an external memory 170, that is, an MMC described with reference to FIGS. 1 to 3. Referring to FIG. 4, the memory 160/170 includes a nonvolatile memory 210, a controller 220, a random access memory 230, and a host interface 240.

The nonvolatile memory 210 may be a flash memory, FRAM, PRAM, MRAM, RRAM, or EEPROM, for example. The controller 220 controls the nonvolatile memory 210. The controller 220 accesses the nonvolatile memory 210 in response to a command and an address received through the host interface 240.

The random access memory 230 may be a working memory of the controller 220. The random access memory 230 may be a buffer memory or a cache memory, for example. The random access memory 230 may be a nonvolatile or volatile random access memory such as SRAM, DRAM, SDRAM, FRAM, MRAM, or RRAM, for example.

The host interface 240 interfaces communications with a host. The controller 220 accesses the nonvolatile memory 210 in response to receiving a normal command and an address through host interface 240. The controller 220 performs a special operation in response to the normal command and address received through the host interface 240 according to a predefined rule.

FIG. 5 is a table showing special functions provided for performing special operations, according to an embodiment of the inventive concept. Referring to FIGS. 1 to 5, exemplary issue, execution, confirm, and status check special functions are provided.

The issue function is a function of issuing one of multiple special operations to the memory 160/170. The execution function is a function of directing execution of the special operation issued to the memory 160/170. The confirm function is a function of requesting an acknowledgement indicating whether any special operation issued. The status check function is a function of requesting information about an operation status of the memory 160/170.

The issue function issues special operations, such as scan and read reclaim, merge, vendor authentication, firmware update, disk information, and all block erase, and the like. The scan and read reclaim operation may include scanning all memory blocks of the memory 160/170 and executing read reclaim for memory blocks, necessitating the read reclaim, from among all memory blocks. For example, the scan and read reclaim operation may be provided when the memory 160/170 includes a flash memory. The read reclaim checks the degree of deterioration of data stored in a memory block, reading data the deterioration level of which is over a reference value, and writing the read data in another memory block.

The merge operation includes generating free memory blocks of the memory 160/170. For example, the merge operation is provided when the memory 160/170 includes a flash memory. The merge operation further includes reading valid data from first memory blocks, storing valid and invalid data, from among memory blocks, storing the valid data thus read in a free block, and erasing the first memory blocks to generate a free memory block.

The vendor authentication operation includes requesting authentication of a vendor. For example, the vendor authentication operation may include requesting predefined vendor signature data. The firmware update operation includes requesting an update of firmware. The disk information operation includes requesting fundamental information of the memory 160/170, such as capacity, speed, and class, for example. The all block erase operation includes requesting erasing of all memory blocks of the memory 160/170.

A command and an address are allocated to each of the special functions for executing special operations. The addresses are within an address range established for the special functions, according to a predefined rule, where each address includes a start sector number, a sector offset, and a sector count.

In the depicted embodiment, a write command is allocated to the issue and execution functions, and a read command is allocated to the confirm and status check functions. For example, a write command is allocated to a function where information to be transferred from a host to the memory 160/170 exists, and a read command is allocated to a function where information to be transferred from the memory 160/170 to the host exists.

The start sector number is a reference for classifying the functions. For example, the start sector number is a start sector number of a cluster of the memory 160/170, and more particularly, the start sector number is a start sector number of a dummy file generated to execute special operations. For purposes of the present illustration, it is assumed that the start sector number is "0x80008000."

The sector offset indicates a location of a sector allocated to a particular function in relation to the start sector number. For example, the sector offset allocated to the issue function for the scan and read reclaim operation and to the status check function is "1." That is, the number of the sector allocated to the issue function for the scan and read reclaim operation and the status check function is the next sector from the start sector, that is, "0x80008001."

The numbers of the sectors allocated to the other functions are determined in the same manner. For example, the sector offset allocated to the issue function for the merge operation is "2." That is, the number of the sector allocated to issue function for the merge operation is "0x80008002." Likewise, a sector offset of "3," a sector offset of "4," a sector offset of "5," and a sector offset of "6" are allocated to the issue functions for the vendor authentication operation, the firmware update operation, the disk information operation, and the all block erase operation, respectively. That is, the numbers of the sectors issued to the issue functions of vendor authentication, firmware update, disk information, and all block erase are "0x80008003," "0x80008004," "0x80008005," and "0x80008006," respectively. A sector offset of "0" is allocated to each of the execution and confirm functions. That is, the number of the sector allocated to each of the execution and confirm functions is the same as the number of the start sector, that is, "0x80008000."

As illustrated in FIG. 5, the host issues a special operation by sending a normal command and an address to the memory 160/170 according to a predefined rule. When the received normal command and address correspond to the predefined rule, the memory 160/170 regards the received normal command and address as a function associated with the special operation.

For example, the rule shown in FIG. 5 is provided to both the host and the memory 160/170. The host reads and uses the rule shown in FIG. 5 from the memory 160/170. For example, the host may detect an identifier of the memory 160/170 and remotely download the rule suitable for the memory 160/170.

In FIG. 5, specific functions for executing special operations are described with reference to specific commands and addresses. However, it is understood that the functions and the commands and addresses associated with the functions are exemplary.

Additional functions may be provided to execute special operations in addition to (or in place of) the exemplary functions shown in FIG. 5. Also, some of the functions shown in FIG. 5 may not be used. That is, the various functions are not limited to the example shown in FIG. 5. Further, the commands and addresses allocated to functions for executing special operations are not limited to the example shown in FIG. 5. Other commands and addresses allocated to functions for executing special operations are sufficient where they use normal commands and are distinguishable.

Generally, the special operations supported by the memory 160/170, as shown in FIG. 5, include operations that require a relatively long execution time (referred to as a first required time), such as the scan and read reclaim, merge, firmware update, and all block erase operations, for example. In comparison, normal operations corresponding to normal commands, such as a read operation and a write operation, have a predefined execution time (referred to as a second time). For example, the second time corresponding to a normal operation may be defined by the host or the specification of the memory 160/170.

The second time may be shorter than the first time. In this case, while a special operation is being performed, the second time allocated to the normal command may elapse. At this time, a timeout occurs at the memory 160/170, which is viewed as an event generating an error from the memory 160/170. To prevent this problem, the computing device 100a/100b, according to an embodiment of the inventive concept, divides a special operation into multiple execution loops, and executes the execution loops sequentially. The time required to execute each execution loop of the special operation is set to be shorter than the second time. Therefore, by dividing the special operation into multiple execution loops, it is possible to prevent a timeout of the memory 160/170 from occurring.

Figure 6:
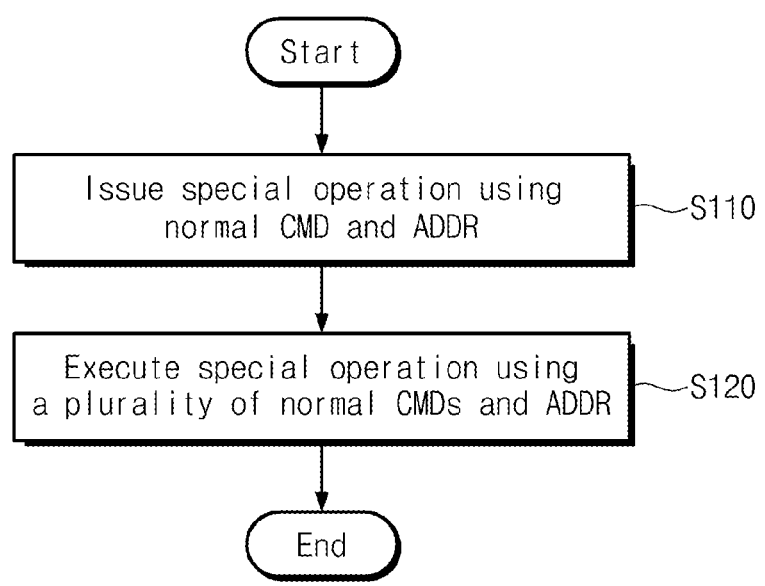
FIG. 6 is a flow chart showing a method of executing a special operation, according to an embodiment of the inventive concept.

FIG. 6 is a flow chart schematically illustrating a method of executing a special operation, according to an embodiment of the inventive concept. Referring to FIGS. 1 to 4 and 6, in step S110, a special operation is issued using a normal command and an address. In step S120, the special operation is executed using multiple normal commands and multiple addresses. Each normal command and address pair is used to request execution of one execution loop of the special operation. That is, the computing device 100a/100b divides the special operation into execution loops, as discussed above, and executes the execution loops using the multiple normal commands and multiple addresses.

Figure 7:
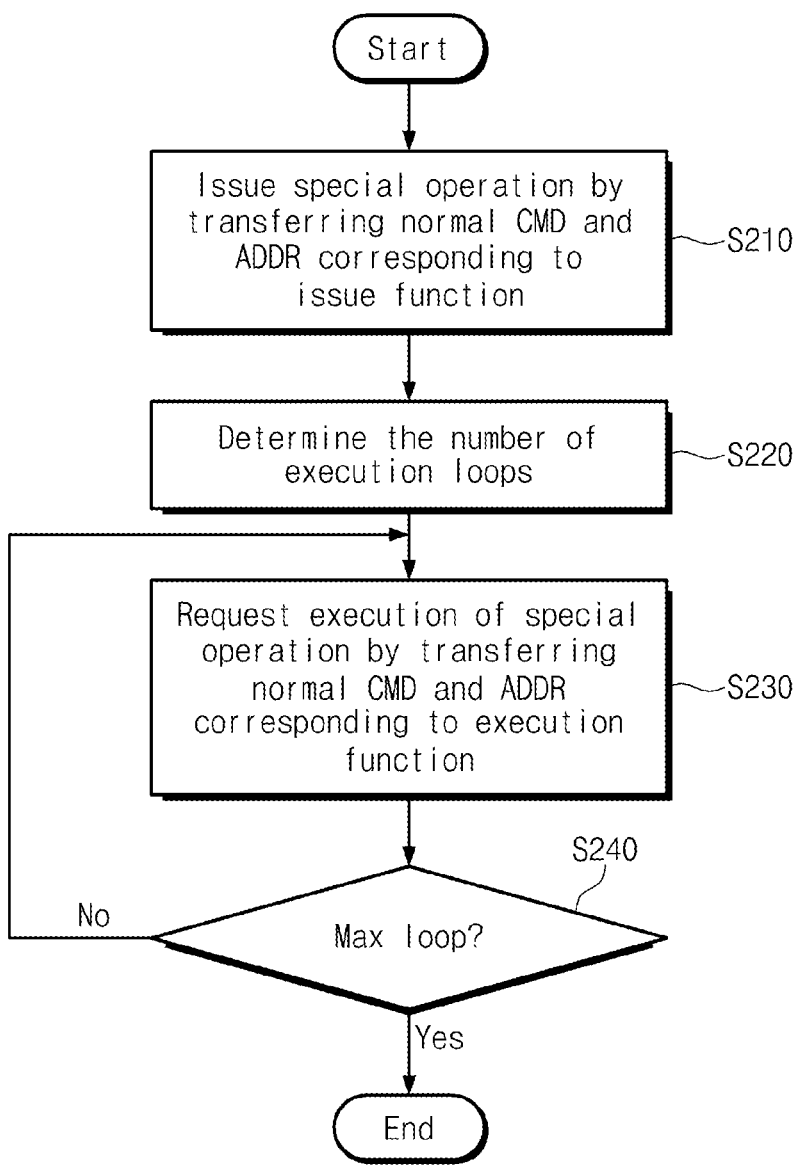
FIG. 7 is a detailed flow chart showing a method of issuing a command by a host for performing a special operation, according to an embodiment of the inventive concept.

FIG. 7 is a detailed flow chart showing a method in which a host issues a command for performing a special operation. Referring to FIGS. 1 to 4 and 7, in step S210, a host issues a special operation by transferring a normal command and an address corresponding to an issue function to the memory 160/170.

In step S220, the number of execution loops for performing the special operation is determined. For example, the number of execution loops of each special operation is predefined according to the type special operation. That is, the host determines the number of execution loops according to the special operation issued. The number of execution loops is decided according to the time required to perform each special operation. The number of execution loops increases in proportion to increases in the required time, and the number of execution loops decreases in proportion to decreases in the required time of each special operation.

In exemplary embodiments, the number of execution loops is a basic value that is defined in common with respect to two or more special operations. The host determines a predefined basic value as the number of execution loops. Information about the number of execution loops may be stored together with a rule (refer to FIG. 5) for management, for example.

In step S230, the host requests execution of the special operation by providing the memory 160/170 with a normal command and an address corresponding to an execution function. In step S240, the host determines whether a current loop is a maximum loop of the special operation. For example, the host determines whether the number of execution functions performed in step S230 has reached the number of execution loops determined in step S220. When the current loop has not yet reached the maximum loop, that is, when the number of execution functions performed does not reach the required total number of execution loops, the method returns to step S230. When the current loop reaches the maximum loop, that is, when the number of execution functions performed reaches the number of execution loops, the host stops requesting the execution function.

Figure 8:
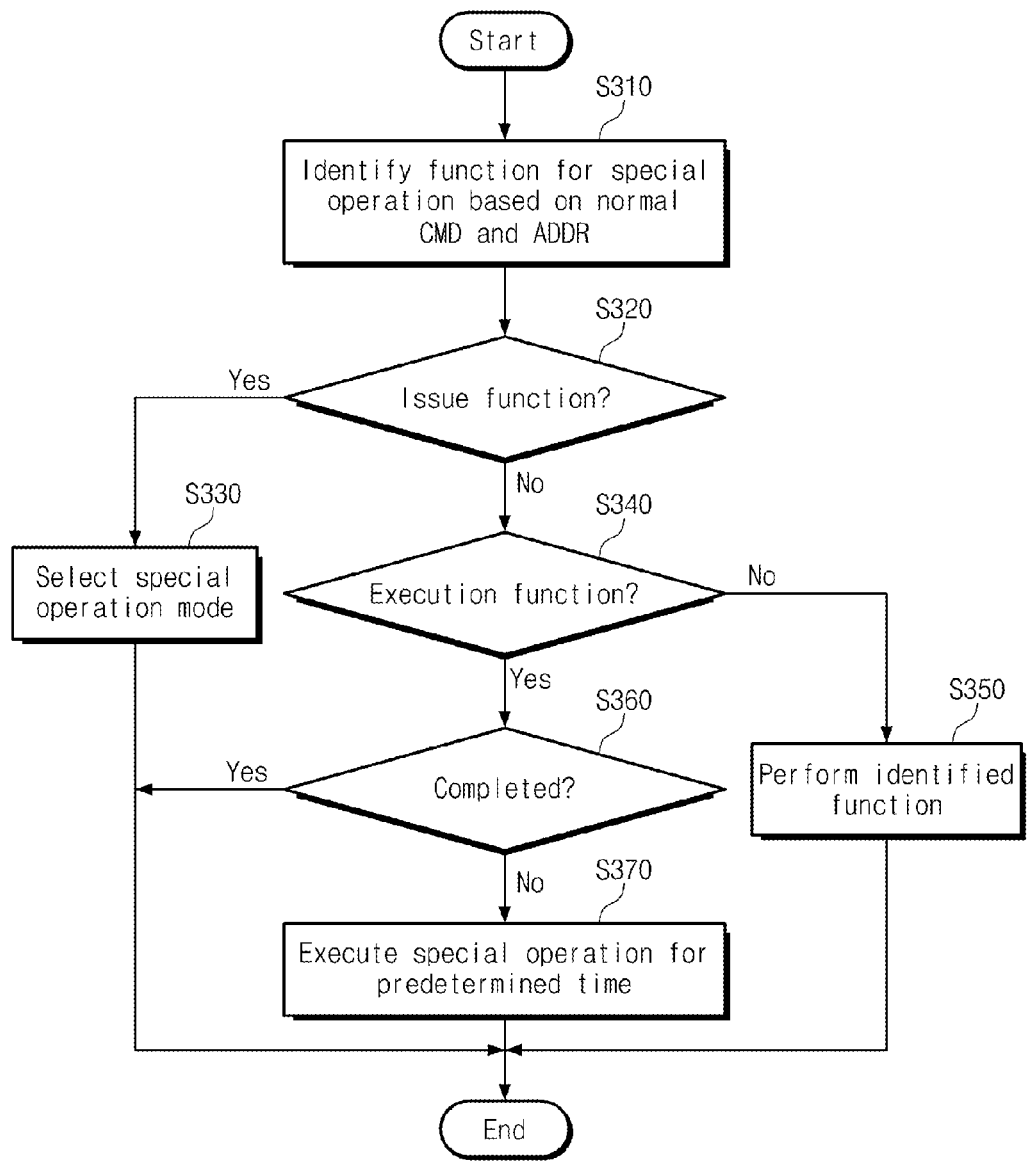
FIG. 8 is a detailed flow chart showing a method of processing a command by a memory for executing a special operation, according to an embodiment of the inventive concept.

FIG. 8 is a detailed flow chart showing a method of processing a command by the memory 160/170 when a special operation is executed. Referring to FIGS. 1 to 4 and 8, in step S310, the memory 160/170 identifies a function associated with the special operation, based on a normal command and an address. For example, when the normal command and the address are received according to the exemplary rule shown in FIG. 5, the memory 160/170 identifies that the function associated with the special operation has been issued.

In step S320, it is determined whether the identified function is an issue function. When the identified function is an issue function, the memory 160/170 selects a special operation mode in step S330, and prepares for execution of the special operation. When the identified function is not an issue function, it is determined in step S340 whether the identified function is an execution function. When the identified function is not an execution function, the memory 160/170 executes the function (e.g., a confirm function or a status check function) in step S350. When the identified function is an execution function, it is determined by the memory 160/170 in step S360 whether the special operation issued is completed. When the special operation issued is completed, the memory 160/170 does not execute the special operation. When the special operation issued is not completed, the memory 160/170 executes the special operation in step S370 during a predetermined time. The predetermined time may be shorter than a timeout time of a normal operation, such as a read operation or a write operation. When the predetermined time elapses, the memory 160/170 stops executing the special operation. The memory 160/170 then starts execution of a new special operation or resumes the special operation that has been stopped.

Figure 9:
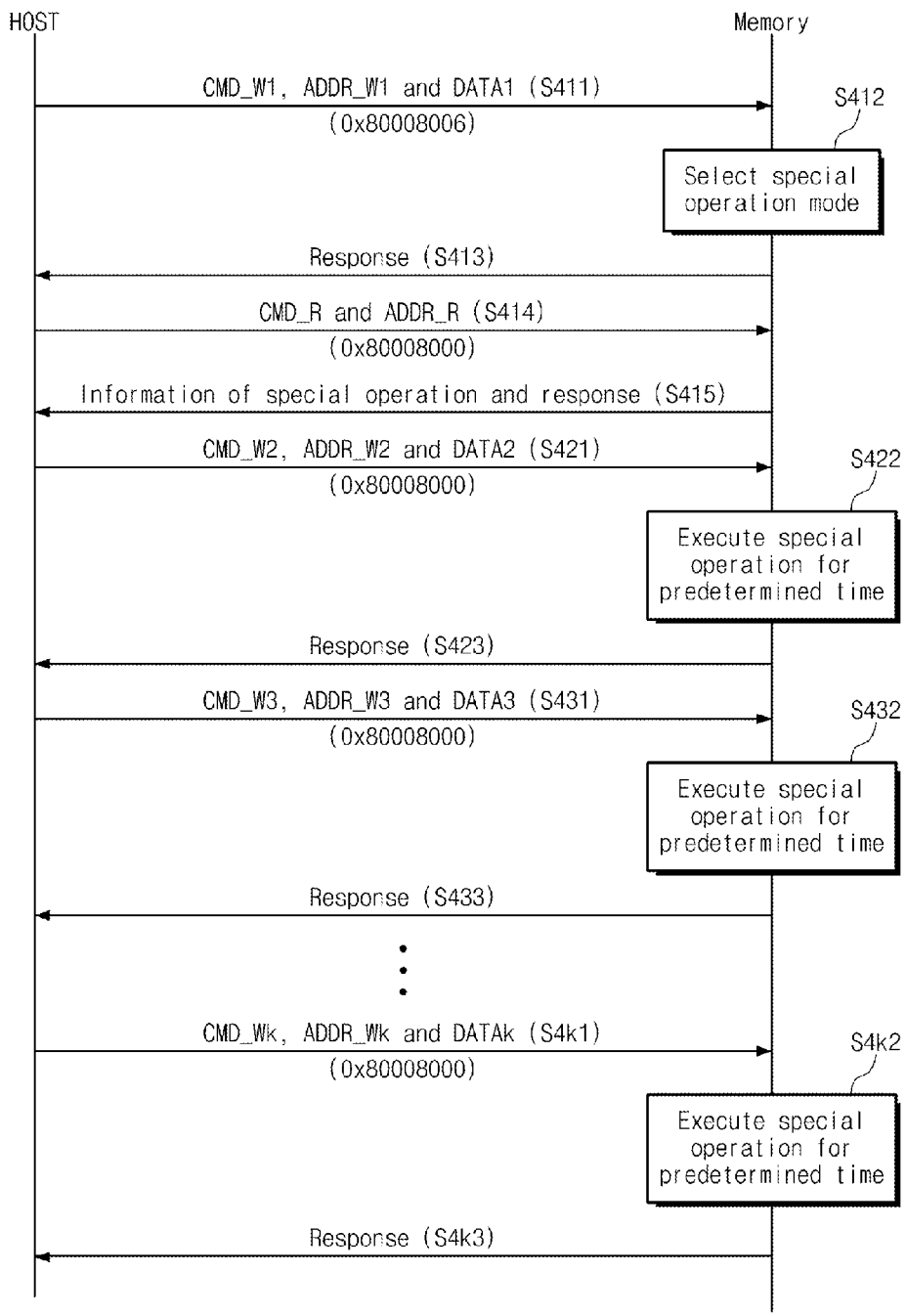
FIG. 9 is a flow chart schematically illustrating an example where a host and a memory execute a special operation.

FIG. 9 is a flow chart schematically illustrating an example in which the host and the memory 160/170 execute a special operation. Referring to FIGS. 1 to 4 and 9, the host issues a special function to the memory 160/170. For example, the host provides the memory 160/170 with a first write command CMD_W1, a first write address ADDR_W1, and data DATA1 in step S411 according to the rule described with reference to FIG. 5. Assuming that the host issues an all block erase operation, for example, the first write address ADDR_W1 is "0x80008006."

In the event that the special operation requires data, the first data DATA1 may include the corresponding data. When the special operation does not require data, the first data DATA1 may be dummy data. Since the all block erase operation does not necessitate data, the first data DATA1 is dummy data in the depicted example.

In step S412, the memory 160/170 selects a special operation mode. For example, the memory 160/170 identifies an issue function for issuance of the all block erase operation in response to the first write command CMD_W1 and the first write address ADDR_W1 received according to the rule shown in FIG. 5. The memory 160/170 is ready to execute the all block erase operation. In step S413, the memory 160/170 sends a response to the host. The response may be a response to the first write command CMD_W1. The memory 160/170 generates any response to be transferred to the host without actually executing a write operation.

In step S414, the host sends a confirm function to the memory 160/170. For example, the host transfers a read command CMD_R and a read address ADDR_R to the memory 160/170 according to the rule shown in FIG. 5. The read address ADDR_R is "0x80008000."

In step S415, the memory 160/170 transfers information about the special operation and a response to the host. For example, the memory 160/170 provides the host with information about the special operation issued from the host, that is, the all block erase operation, as information of the special operation. The information of the special operation is transmitted as data read according to the read command CMD_R. The memory 160/170 generates information of the special operation to be transferred to the host without actually executing a read operation. The response is a response to the read command CMD_R.

In the event that information of the special operation received from the memory 160/170 does not correspond to the special operation issued, that is, in the event that information of the special operation does not indicate the all block erase operation, the host stops executing the special operation. In the event that information of the special operation received from the memory 160/170 corresponds to the special operation issued, that is, in the event that information of the special operation indicates the all block erase operation, the host continues to execute the special operation.

In step S421, the host sends an execution request to the memory 160/170. For example, the host provides the memory 160/170 with a second write command CMD_W2, a second write address ADDR_W2, and second data DATA2 according to the rule shown in FIG. 5. The second write address ADDR_W2 is "0x80008000," which corresponds to the all block erase operation in the present example. In the event that the special operation issued requires data, the second data DATA2 includes corresponding data. When the special operation issued does not require data, the second data DATA2 is dummy data.

In step S422, the memory 160/170 performs the special operation during a predetermined time. For example, the memory 160/170 performs the all block erase operation during a predetermined time, sequentially erasing memory blocks. When the predetermined time elapses, the memory 160/170 stops erasing memory blocks.

In step S423, the memory 160/170 sends a response to the host. The response is a response to the second write command CMD_W2. For example, the memory 160/170 generates any response to be transferred to the host without executing a write operation corresponding to the second write command CMD_W2.

Steps S431, S432, and S433 are performed in the same manner as described above with reference to steps S421, S422, and S423, respectively, continuing to execute the special operation for the predetermined time. Likewise, steps S4k1, S4k2, and S4k3 are performed in the same manner as described above with reference to steps S421, S422, and S423.

Figure 10:
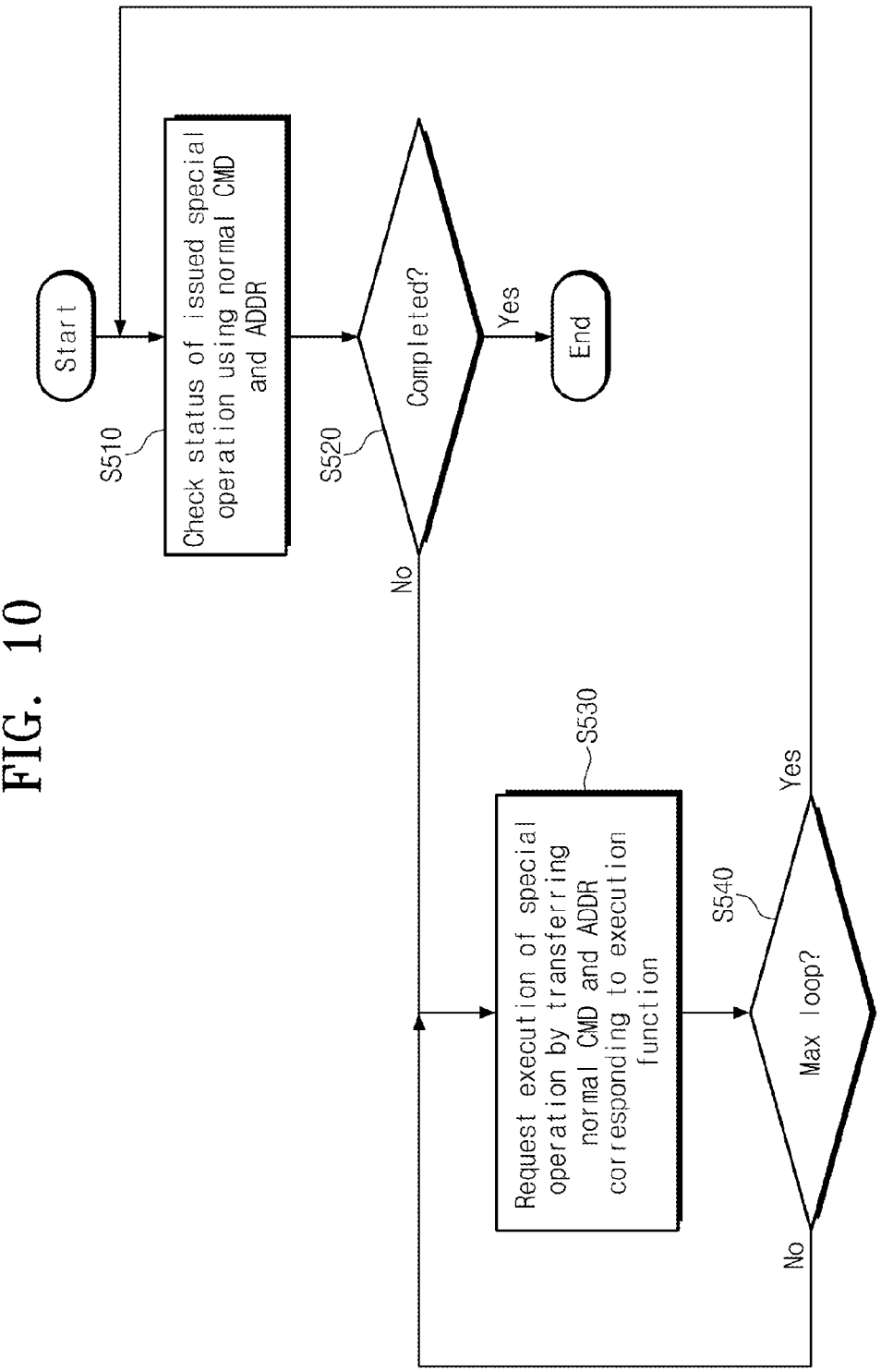
FIG. 10 is a detailed flow chart showing a method of performing a status check operation by a host, according to an embodiment of the inventive concept.

FIG. 10 is a flow chart schematically illustrating a method according to which the host performs a status check function. In exemplary embodiments, the status check function of FIG. 10 is performed after the method described with reference to FIG. 7 is executed. That is, the status check function is performed after a special operation is executed using multiple normal commands and multiple addresses.

Referring to FIGS. 1 to 4 and 10, in step S510, the host checks a status of an issued special operation, using a normal command and an address. For example, the host provides the memory 160/170 with a normal command and an address according to the rule allocated to a status check function described with reference to FIG. 5, and checks the status of the issued special operation.

In step S520, the host determines whether the issued special operation is completed. When the issued special operation is completed, the host ends execution of the special operation. When the special operation issued is not completed, the host requests execution of the special operation in step S530 by sending multiple normal commands and multiple addresses.

In step S540, the host determines whether the current loop has reaches a maximum loop. If so, the method returns to step S510. If not, the method returns to step S530. Steps S530 and S540 are performed in the same manner as steps S230 and S240 described above with reference to FIG. 7, and thus description thereof will not be repeated.

In exemplary embodiments, the number of execution loops in steps S530 and S540 is equal to or less than the number of execution loops in steps S230 and S240. The number of execution loops in steps S530 and S540 is used in common with respect to each special operation or with respect to two or more special operations.

Figure 11:
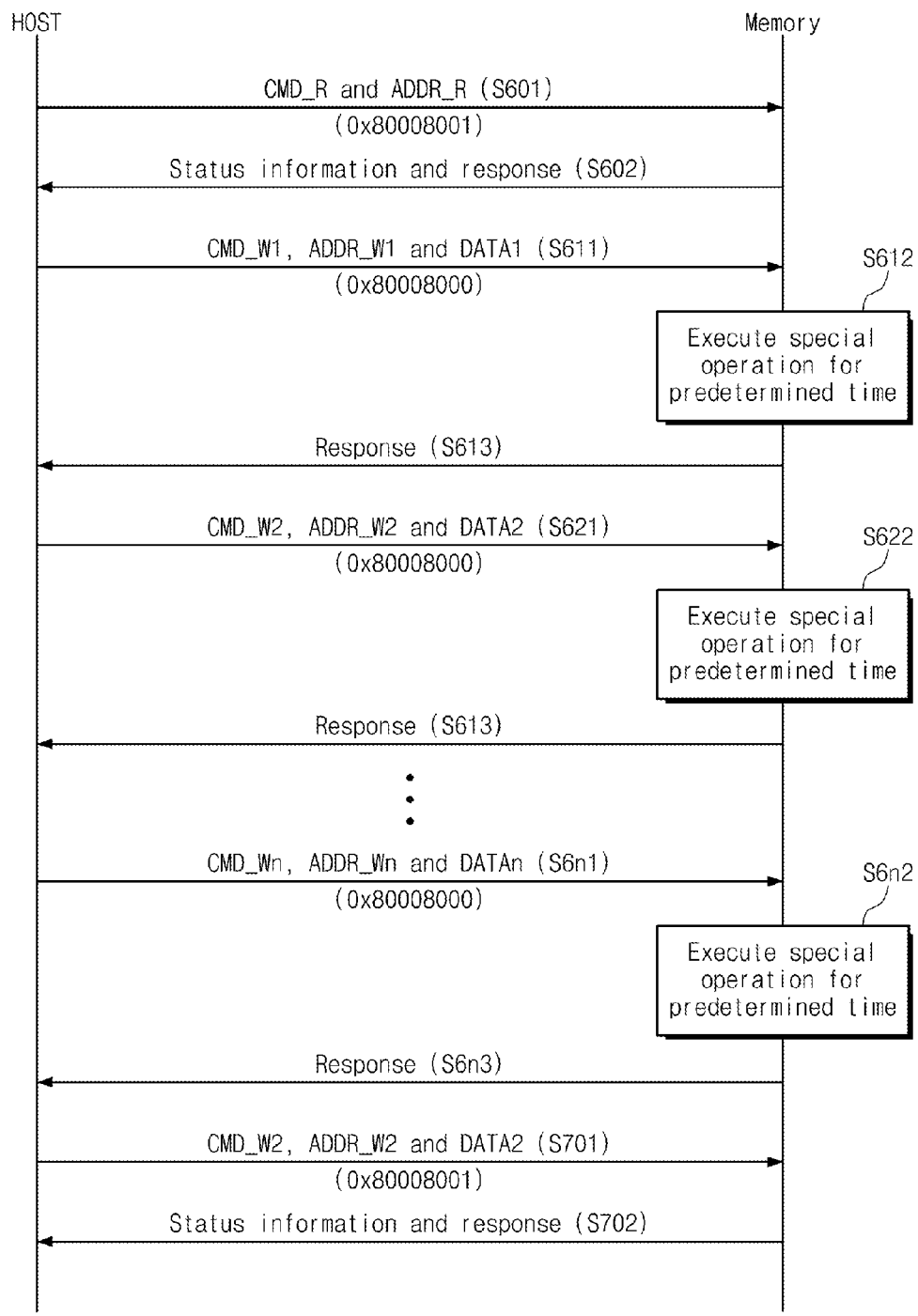
FIG. 11 is a flow chart schematically illustrating an exemplary method of performing a status check and executing a special operation following the status check, according to an embodiment of the inventive concept.

FIG. 11 is a flow chart schematically illustrating an example in which a status check function and a special operation following the status check function are executed. Referring to FIGS. 1 to 4 and 11, in step S601, a host requests the status check function at the memory 160/170. For example, the host transfers a read command CMD_R and a read address ADDR_R according to the rule shown in FIG. 5. The read address ADDR_R is "0x80008001."

In step S602, the memory 160/170 sends status information and a response to the host. The status information includes information about a progression status of the issued special operation. The status information is provided to the host as data read according to the read command CMD_R. For example, the memory 160/170 generates the status information to be provided to the host without executing an actual read operation corresponding to the read command CMD_R. The response is a response to the read command CMD_R.

In exemplary embodiments, when the status information indicates that the special operation is completed, the host terminates execution of the special operation. In contrast, when the status information indicates that the special operation is not completed, the host continues to execute the special operation. For example, one or more execution loops formed of steps S611 to S613, steps S621 to S623, up to steps S6n1 to S6n3 are executed.

In step S701, the host requests the status check at the memory 160/170. In step S702, the memory 160/170 provides status information and a response to the host. When the status information indicates that the special operation is completed, the host ends the special operation. In alternative configurations, status checks may be performed after each execution loop.

Figure 12:
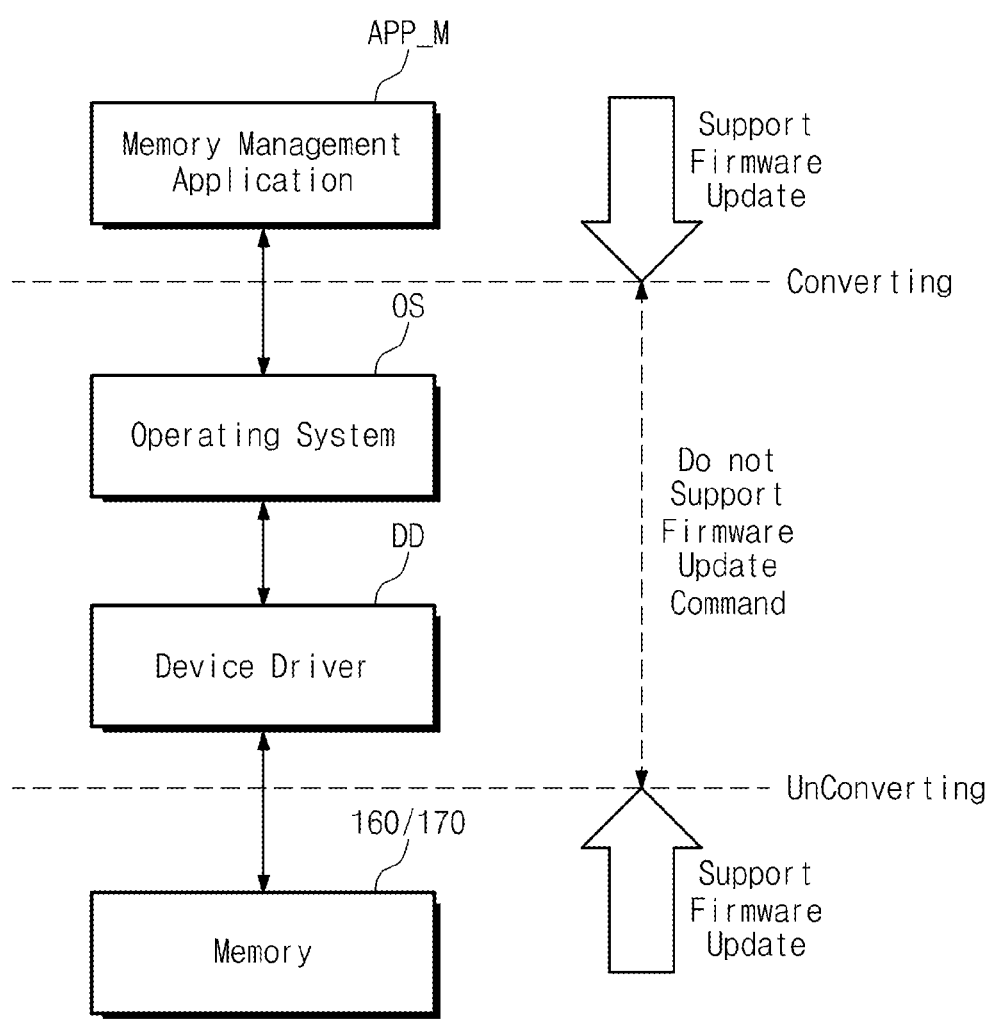
FIG. 12 is a block diagram schematically illustrating a software hierarchy, according to an embodiment of the inventive concept.

FIG. 12 is a block diagram schematically illustrating a software hierarchy, according to an embodiment of the inventive concept. Referring to FIG. 12, a memory management application APP_M is driven on an operating system OS. The memory management application APP_M is management software that optimizes operation performance and improves reliability of the memory 160/170. The memory management application APP_M provides a variety of memory management tools using a variety of special operations supported by the memory 160/170. For example, the memory management application APP_M may be based on a special operation.

In the event that execution of a special operation of the memory 160/170 is required, the memory management application APP_M converts a request for a special operation into a normal command and an address corresponding to the rule shown in FIG. 5, for example, based on methods described with reference to FIGS. 5 to 11. For example, the memory management application APP_M may request the special operation at the memory 160/170 such that the special operation is divided into multiple execution loops, and the execution loops are performed using multiple normal commands and multiple addresses, respectively.

The operating system OS does not grant a root authority to the memory management application APP_M. Although the operating system OS grants a root authority to the memory management application APP_M, the memory 160/170 is connected via a reader 180 (refer to FIG. 3). That is, the operating system OS and a device driver DD operate based on a normal command.

A request for the special operation is converted into a normal command and an address for transmission. Thus, although the operating system OS does not grant a root authority to the memory management application APP_M, and although the memory 160/170 is connected via the reader 180, the request for the special operation generated by the memory management application APP_M is transferred to the memory 160/170 using a normal command and an address.

The memory 160/170 extracts the request for the special operation from the normal command and address. The memory 160/170 performs the special operation according to the request for the special operation thus extracted. That is, the memory 160/170 operates based on the special operation.

According to embodiments of the inventive concept, although a layer of only supporting a normal command exists between the memory management application APP_M and the memory 160/170, the memory management application APP_M is able to issue the special operation to the memory 160/170. Also, the special operation may be divided into multiple execution loops, and a required time of each execution loop is set to be shorter than the timeout time of the command. Also, although a layer of only supporting a normal command exists between the memory management application APP_M and the memory 160/170, the memory management application APP_M does not cause a timeout and issues the special operation to the memory 160/170. Thus, a command issuing method and a command processing method are provided to improve operation performance.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The invention claimed is:

1. A method of providing special functions, comprising:
receiving from a host a first normal command and a first address, the first normal command corresponding to a normal operation;
identifying a first special function, different from the corresponding normal operation, based on the first normal command and the first address when the first address is in an address range established for special functions according to a predefined rule;
receiving from the host a second normal command and a second address; and
executing a selected special operation from among a plurality of special operations for a predetermined time, the predetermined time being less than a timeout time of the second normal command.

2. The method of claim 1, wherein the identified first special function comprises an issue function, and the first address corresponds to the selected special operation from among the plurality of special operations according to the predefined rule.

3. The method of claim 2, wherein the plurality of special operations comprise at least two of a scan and read reclaim operation, a merge operation, a vendor authentication operation, a firmware update operation, a disk information operation and an all block erase operation.

4. The method of claim 2, further comprising:
identifying a second special function based on the second normal command and the second address when the second address is in the address range established for the special functions according to the predefined rule.

5. The method of claim 4, wherein each of the first and second normal commands comprises one of a write command and a read command.

6. The method of claim 4, wherein the first address comprises a start sector number and a first sector offset number corresponding to the first special function, and the second address comprises the start sector number and a second sector offset number corresponding to the second special function.

7. The method of claim 4, wherein the first address comprises a start sector number and a first sector count corresponding to the first special function, and the second address comprises the start sector number and a second sector count corresponding to the second special function.

8. The method of claim 4, wherein the identified second special function comprises an execution function, and the selected special operation is executed in response to the execution function.

9. The method of claim 8, further comprising:
receiving from the host another normal command and another address of a another special function corresponding to a confirm function; and
sending information in response to the confirm function indicating whether the selected special operation is issued, prior to receiving the second normal command and a second address.

10. The method of claim 1, further comprising:
determining whether the selected special operation is complete after the predetermined time; and
when the selected special operation is not complete, again receiving from the host the second normal command and the second address of a second special function, corresponding to an execution function, and executing the selected special operation for the predetermined time.

11. The method of claim 1, further comprising:
executing the selected special operation a predetermined number of loops, each loop corresponding to a predetermined time less than the timeout time of the second normal command.

12. The method of claim 11, further comprising:
after the predetermined number of loops, receiving from the host another normal command and another address of another special function corresponding to a status check function; and
sending a response to the host indicating a status of the selected special operation after the predetermined number of loops in response to the status check function.

13. A memory device, comprising:
a host interface for interfacing communications with a host device running an application;
a nonvolatile memory for storing a plurality of special operations executable by the application; and
a controller for accessing the nonvolatile memory in response to normal commands and corresponding addresses received from the application through the host interface, wherein the controller is configured to:
receive a first normal command and a first address of the nonvolatile memory via the host interface, the first normal command corresponding to a normal operation;
identify a first special function, different from the corresponding normal operation, based on the first normal command and the first address when the first address is in an address range established for special functions according to a predefined rule; and
receive a second normal command and a second address of the nonvolatile memory via the host interface,
wherein the first address corresponds to a selected special operation from among a plurality of special operations according to the predefined rule, and wherein the controller is further configured to execute the selected special operation a predetermined number of loops, each loop corresponding to a predetermined time less than a timeout time of the second normal command.

14. The memory device of claim 13, wherein the identified first special function comprises an issue function.

15. The memory device of claim 14, wherein the controller is further configured to:
identify a second special function based on the second normal command and the second address when the second address is in the address range established for special functions according to the predefined rule.

16. The memory device of claim 15, wherein the identified second special function comprises an execution function, and
wherein the controller is further configured to execute the selected special operation corresponding to the first address in response to the execution function.

17. The memory device of claim 13, wherein the controller executes the selected special operation for a predetermined time, the predetermined time being less than the timeout time of the second normal command.

18. The memory device of claim 17, wherein the controller is further configured to perform a loop comprising:
determining whether the selected special operation is complete after the predetermined time; and
when the special operation is not complete, receiving via the host interface the second normal command and the second address of the second special function, corresponding to the execution function, and again executing the selected special operation for the predetermined time.

19. The memory device of claim 14, after executing the selected special operation the predetermined number of loops, the controller is further configured to:
receive via the host interface another normal command and another address of another special function corresponding to a status check function; and
send a response to the host device indicating a status of the selected special operation after the predetermined number of loops in response to the status check function.

20. The memory device of claim 13, wherein the memory device comprises one of an embedded MultiMedia Card (eMMC) or a MultiMedia Card (MMC), and
wherein the special operations are operations that are not included among normal operations executable by the host device.

21. A method implemented by a host device for performing a plurality of special operations specific to a memory device interfacing with the host device, the method comprising:
issuing a selected special operation from among the plurality of special operations by sending to the memory device a first normal command and a first address corresponding to an issue function of the selected special operation, the first address being in an address range established for special functions according to a predefined rule;
requesting execution of the selected special operation by sending to the memory device a second normal command and a second address corresponding to an execution function, the second address being in the address range established for special functions according to the predefined rule;
determining a number of loops required for executing the selected special operation, each loop corresponding to a predetermined time less than a timeout time of the second normal command; and
repeatedly requesting execution of the selected special operation, by sending to the memory device the second normal command and the second address corresponding to the execution function, a number of times corresponding to the determined number of loops.

22. The method of claim 21, further comprising:
requesting a status check after the determined number of loops by sending to the memory device another normal command and another address corresponding to a status check function, the another address being in the address range established for special functions according to the predefined rule; and
receiving a response from the memory device indicating a status of the selected special operation after the determined number of loops.

23. The method of claim 21, further comprising:
sending to the memory device a confirm request corresponding to a confirm function, the confirm request comprising another normal command and another address corresponding to the confirm function, the another address being in the address range established for special functions according to the predefined rule; and
receiving information from the memory device regarding the plurality of special operations; and
confirming whether the selected special operation is supported by the memory device prior to requesting execution of the selected special operation.

24. The method of claim 21, wherein the memory device comprises one of an embedded MultiMedia Card (eMMC) or a MultiMedia Card (MMC), and the plurality of special operations are operations not included among normal operations of the host device.

* * * * *